United States Patent [19]
Sanford et al.

[11] 3,738,164
[45] June 12, 1973

[54] MEASUREMENTS PERTAINING TO OCEAN CURRENTS BY GEOMAGNETIC INDUCTION

[75] Inventors: Thomas B. Sanford, West Falmouth; Robert G. Drever, Hatchville, both of Mass.

[73] Assignee: Woods Hole Oceanographic Institution, Woods Hole, Mass.

[22] Filed: May 21, 1971

[21] Appl. No.: 145,816

[52] U.S. Cl. .................................. 73/170 A, 73/189
[51] Int. Cl. ............................................... G01n 9/08
[58] Field of Search.................. 73/170, 170 A, 189

[56] References Cited
UNITED STATES PATENTS

| | | | |
|---|---|---|---|
| 3,359,794 | 12/1967 | Rosenberg | 73/189 |
| 3,308,659 | 3/1967 | Herndon | 73/189 X |
| 3,372,585 | 2/1968 | Niskin | 73/189 X |
| 3,370,462 | 2/1968 | Bartlett et al. | 73/189 |

*Primary Examiner*—Richard C. Queisser
*Assistant Examiner*—Arthur E. Korkosz
*Attorney*—Kenway, Jenney & Hildreth

[57] ABSTRACT

The variations in the magnitudes and the directions of horizontal ocean currents are measured as a function of depth. A measuring probe falls to a predetermined depth and is carried by the current. The probe has a circuit within which a varying elecric potential is induced by the earth's magnetic field. This potential is a function of the velocity of the probe and the velocity of the sea water. Data derived from this potential and the related sea water temperature and pressure are used to derive detailed vertical characteristic profiles of ocean currents.

37 Claims, 11 Drawing Figures

INVENTORS
THOMAS B. SANFORD
ROBERT G. DREVER
BY Kenway, Jenney & Hildreth
ATTORNEYS

INVENTORS
THOMAS B. SANFORD
ROBERT G. DREVER

BY Kenway, Jenney
& Hildreth
ATTORNEYS

MEASUREMENTS PERTAINING TO OCEAN CURRENTS BY GEOMAGNETIC INDUCTION

BACKGROUND OF THE INVENTION

The invention herein described was made in the course of or under a contract or subcontract thereunder, (or grant) with the Office of Naval Research.

This invention relates generally to methods and instruments useful for measuring the speed of ocean currents as a function of depth, this data to be correlated with data such as the temperature and current direction.

Instruments previously used include certain forms that are limited to measurements of current velocity at the surface. See for example W. S. von Arx, "An electromagnetic method for measuring the velocities of ocean currents from a ship under way," in Papers in Physical Oceanography and Meteorology, Vol. II(3), p. 62 1950, published by Massachusetts Institute of Technology and Woods Hole Oceanographic Institution. Certain other forms employ principles of operation that depend for accuracy upon precise navigation or positional control. Navigational data may consist of celestial, radio or satellite fixes or acoustic ranging. In some instances no navigational information is available or used, and in such cases certain assumptions must be made, as for example, that a ship carrying the measuring instrument is drifting at constant speed. Experience has shown, however, that without adequate navigational control these methods are of little practical utility for accurate measurements of vertical profiles.

Currently, the two most common methods for measuring the vertical structure of ocean currents are, first, a current meter lowered on a wire, and second, a series of free instruments released at the sea surface each of which falls to a given depth and returns to the surface. Both methods require good positional control. The current meter is lowered from a drifting or slowly moving ship. The velocity measured at any depth is a complicated function of the motion of the ship and of the current meter on the end of a long wire. Generally it is necessary to allow several minutes of time for the motion of the current meter to come to equilibrium at a given depth before the data is taken. This procedure severely limits the number of depths at which data may be obtained and greatly extends the amount of time required for the work. A typical current-meter station may require several hours to measure the flow at a number of depths. Considerable vertical detail can be obtained, but the data has reduced value because the velocity structure is usually changing during the period of observation. The integration of the ship's motion into the current meter data is usually a tedious and difficult process.

The free-fall instrument is described by W. S. Richardson and W. J. Schmitz in "A technique for the direct measurement of transport with application to the straits of Florida," Journal of Marine Research, Vol. 23, pp. 172-185, 1965, published by The Sears Foundation for Marine Research, Yale University. In this method a passive instrument is ballasted to fall to a given depth or to the bottom, and to return to the sea surface. To use this method precise navigation is required, so that the positions of the release and of the later surfacing are accurately known. The difference between the start and end positions, divided by the run time, equals the horizontal velocity averaged over the depth of operation. Simultaneous drops of several passive instruments, each falling to a different depth, are used to study the gross vertical structure of an ocean current. However, the lack of fine-scale velocity data is a severe disadvantage inherent in the passive free-fall techinque.

SUMMARY OF THE INVENTION

This invention uses a probe having an electrically conductive component in which a voltage is induced by the movement of the instrument and of the sea water through the vertical component of the earth's magnetic field. The probe is carried with a horizontal velocity or component of velocity by the sea water. It is allowed to fall to the depths for which measurements are desired. The induced voltage is a function of the instantaneous velocity of the probe relative to the vertically-averaged horizontal velocity of the water from the surface to the bottom.

The detected voltage may be induced by transformer coupling to the electrical current flowing in the sea water normally to its direction of motion. Alternatively, it may be induced in a pair of electrodes between which an electric potential is induced by the earth's magnetic field as a result of the movement of the instrument and the sea water. The potential induced in the electrodes may have an unwanted component caused by vertical movement of the probe through the horizontal component of the earth's field. This component may be cancelled, leaving a component caused by the horizontal movement of the probe through the vertical component of the earth's field and a component due to the electric field in the sea. These components provide a measure of the water velocity relative to the vertically-averaged horizontal velocity of the water from the surface to the bottom.

Signals useful for recording the magnitude and direction of the variable relative velocity are internally recorded or transmitted for recording in conjunction with other coordinated data permitting translation into terms of absolute water velocity.

BRIEF DESCRIPTION OF THE DRAWING

FIGS. 3A and 3B are schematic diagrams of second and third embodiments of the electric field sensor.

FIG. 5 is a simplified schematic lumped constant equivalent low-frequency circuit diagram of the electric field sensor of FIG. 3.

FIG. 6 is a diagram similar to FIG. 5 illustrating a case used for purposes of explanation.

FIG. 8 is a fragmentary view in perspective of a probe comprising a fourth embodiment of the invention.

DESCRIPTION OF THE PREFERRED EMBODIMENT

Figure 1:
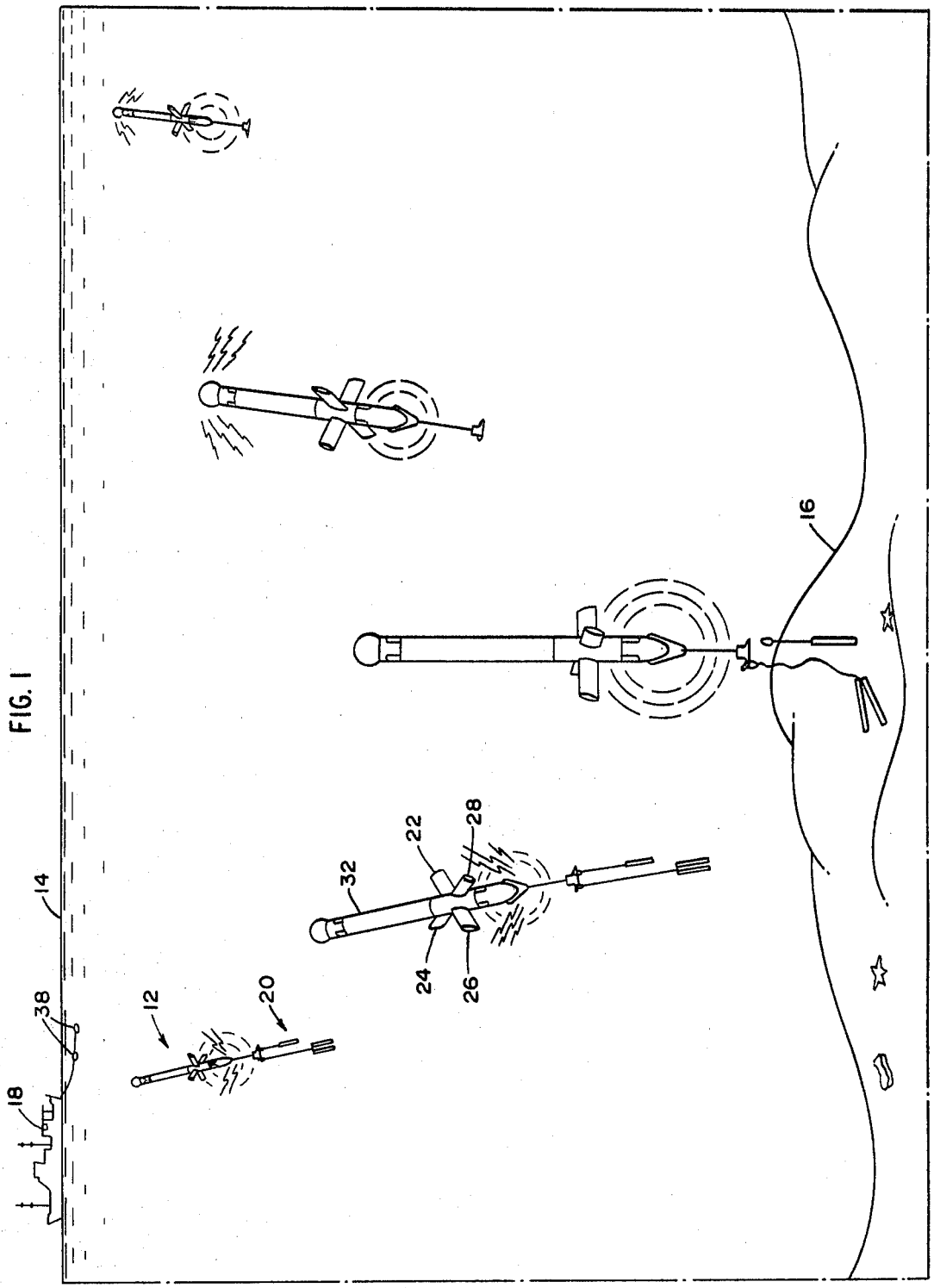
FIG. 1 is a diagram showing a time sequence depicting the operation of a first embodiment of the invention.
Figure 2:
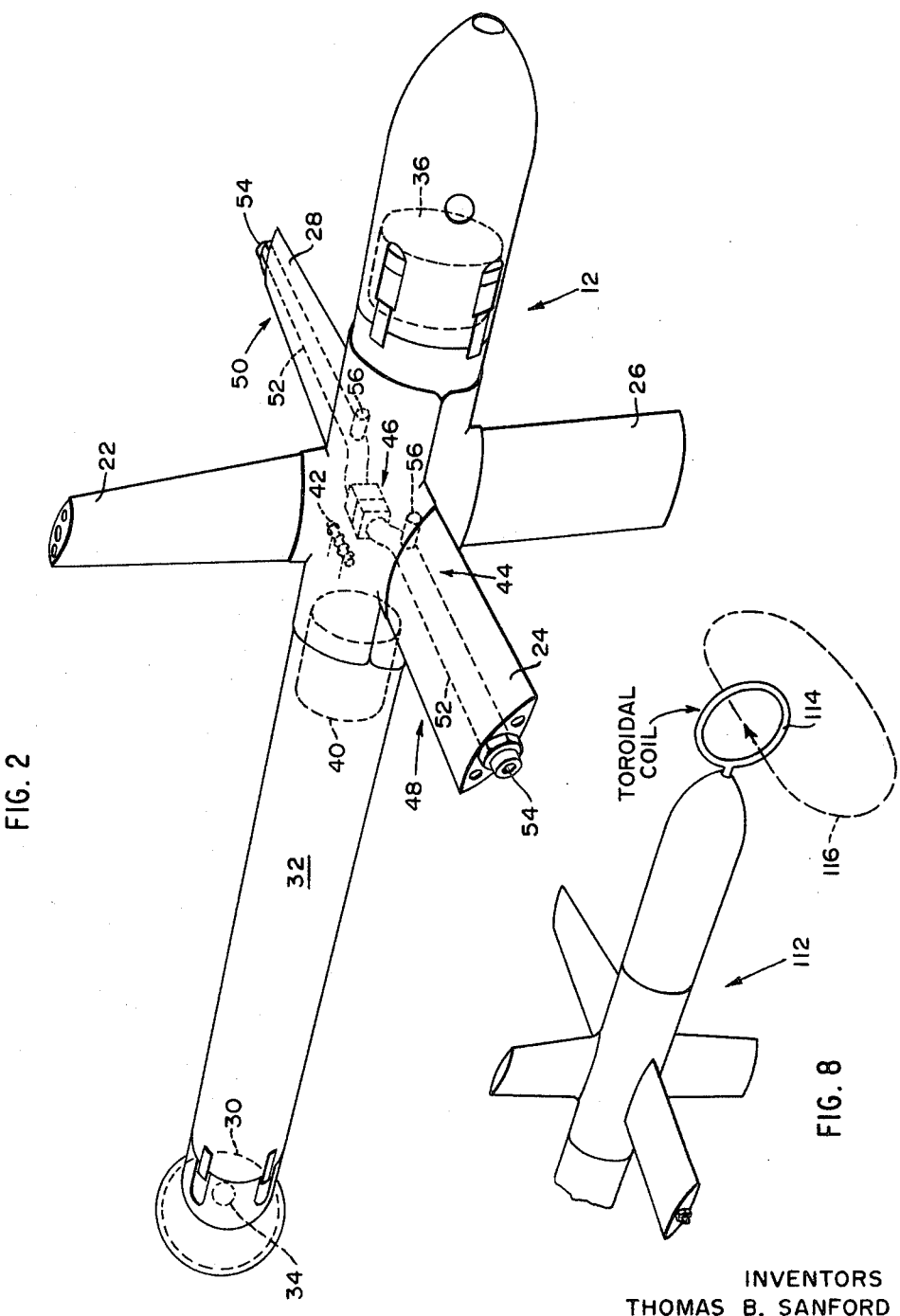
FIG. 2 is a view in perspective of the probe of FIG. 1 showing the locations of major components.

Referring to a first embodiment shown in FIGS. 1 and 2, a probe 12 is released at the surface 14 of a body of water such as the ocean, falls freely toward the bottom 16 and then returns to the surface for ultimate recovery. As the probe falls, it is carried at the same horizontal velocity as the contiguous sea water. Conveniently, the probe is released from and recovered by a vessel 18. It is initially fitted with conventional balloon flotation means and a conventional delayed surface release device (not shown), and cast adrift to float until the vessel is well clear of it. The flotation means are then released and the probe sinks under the pull of releasable weights 20 fastened to one end, spinning as it falls under the action of four fixed-pitched fins 22, 24, 26 and 28. An air-filled glass ball 30 on an end of the body 32 of the probe maintains the body in a substantially vertical orientation throughout the descent and ascent. At the bottom the weights are released by a well-known unlatching mechanism operable upon impact, and the buoyancy of the probe is sufficient to cause it to return to the surface. On the ascent a flasher 34 such as a xenon tube, external to the ball 30, is automatically periodically actuated to permit detection by the recovery vessel.

During both the descent and ascent, the probe of this embodiment sends out acoustical pulses to the vessel 18 by means of an electro-acoustic transducer 36. These pulses are picked up by one or more hydrophones 38 trailed from the vessel by a tow cable near the surface. The vessel preferably contains a conventional type of graphic recorder upon which the pulses are suitably recorded as functions of time. Alternatively, instead of transmitting the data pulses the probe may be fitted with means to record the data internally.

Figure 3:
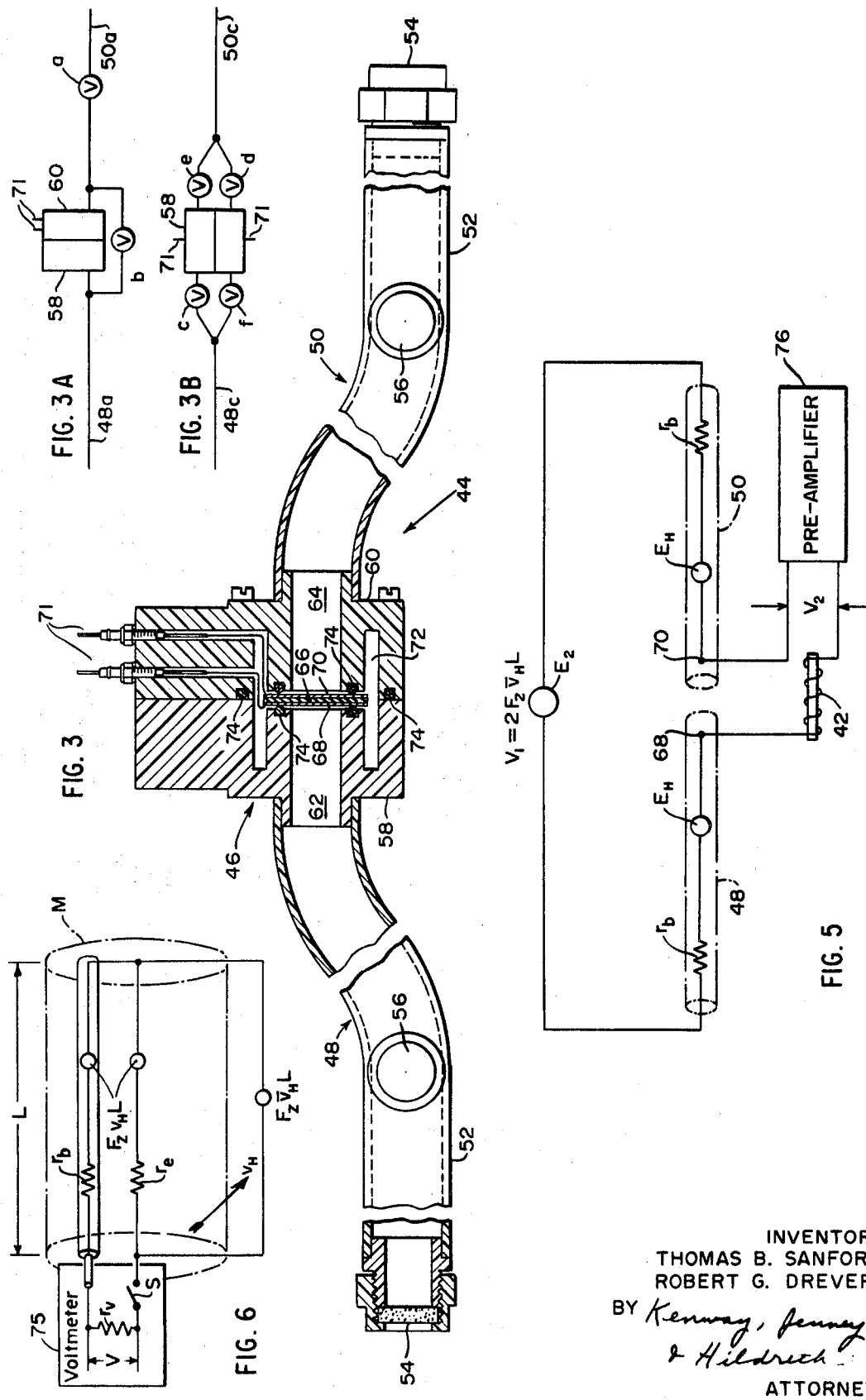
FIG. 3 is an elevation in section of the electric field sensor of FIG. 2.

The transducer 36 or alternative internal recorder is actuated by an electronic circuit 40 which is in turn connected with a correction coil 42 and an electric field sensor 44. Referring to FIG. 3, the latter comprises an electrode block assembly 46 and two arms 48 and 50 extending from this assembly through a pair of opposed fins 24 and 28, each arm being filled with sea water and having electrical contact with the surrounding sea water at its outboard end. The arms are preferably in the form of so-called "salt bridges," and consist of insulating tubes 52 of polyvinyl chloride or other equivalent material filled with sea water and then plugged with porous glass plugs 54 permitting little if any water transfer across the glass, but allowing electrical conduction. A rubber diaphragm 56 is preferably mounted upon each arm and communicates with the sea water therein to cause the pressure in the latter to equal that of the outside pressure at all depths.

The bock assembly 46, also preferably constructed of polyvinyl chloride or equivalent material, consists of two blocks 58 and 60 bolted together and having central chambers 62 and 64 communicating with the water in the respective arms. Separating the chambers 62 and 64 is a thin beryllium oxide plate 66 which acts as a good thermal conductor and an electrical insulator. A pair of silver-silver chloride electrodes 68 and 70 are located in the respective chambers 62 and 64 and are connected in series with the coil 42 to the circuit 40 by means of suitable terminal jacks 71. In practice, the eletrodes 68 and 70 are preferaby electrolytically deposited upon the respective surfaces of the plate 66 in position to be exposed to the water. Within the block 46 in an annular region surrounding the junctures of the arms 48 and 50 there is an oil-filled chamber 72, and O-rings 74 mutually seal the chambers 62, 64 and 72.

In operation, the movement of the arms in a direction having a component transverse to the direction of the earth's magnetic field induces a variable voltage between the electrodes 68 and 70 which is detected and used to control the signal pulses telemetered by the radiator transducer 36, or internally recorded as an alternative. For a better understanding of this phenomenon, reference may be had to FIGS. 5 and 6 in connection with the following explanation.

In this discussion, it is assumed that the probe 12, at all depths, is moving at the same horizontal velocity as the contiguous sea water, as to both direction and magnitude. It is also assumed that the vertical velocity of the water is negligible compared to the vertical velocity of the probe, that is, less than 1 cm/sec for a typical vertical probe speed of 1.25 m/sec. Thus the velocity of the probe can be analyzed into two vectors, namely the horizontal velocity of the water $v_H$ and the buoyancy induced vertical velocity $v_z$. These vectors are at right angles to one another.

It is the component $v_H$ that is of interest for quantitative measurement, and the component $v_z$ is employed only as the means of obtaining successive measurements for construction of a velocity profile from the surface to the bottom. As further shown below, the induced voltage between the electrodes 68 and 70 contains components attributable to both $v_H$ and $v_z$ and it is necessary to eliminate the effect of the latter. For this purpose we may employ one of several alternative methods. In the embodiment of FIGS. 1 to 3 and 4 the coil 42 is employed. This is a helical coil having its axis parallel with the line between the plugs 54, and its function is further explained below. Another method is to measure the rate of change of pressure, which is directly proportional to $v_z$, and to produce a voltage therefrom to cancel the unwanted component.

The earth's magnetic field is also a vector that is conveniently analyzed into components in a coordinate system ($x$, $y$, $z$) used as a convenient frame of reference. In this system z is the direction of gravity and y is magnetic north. Thus the earth's field can be analyzed into two components, namely, $F_y$ and, except at the magnetic equator, $F_z$. In order to consider the electromagnetic interrelation of the probe velocity and the field, the velocity component $v_H$ is analyzed into components $v_x$ and $v_y$.

It will be noted that the arms 48 and 50 are maintained horizontal and rotated. Defining the angular velocity as $\omega$ (typically about 0.1 to 0.15 $H_z$ at 1m/sec to 1.25 m/sec vertical velocity) the velocity components $v_x$ and $v_y$ acting with respect to $F_z$ induce in each arm the following electric field potentials measured in volts, by electromagnetic induction:

$$F_z v_y L \sin \omega t, \text{ and}$$

(1)

$$F_z v_x L \cos \omega t, \tag{2}$$

where $L$ is the length of the arm and the time $t$ equals zero when $L$ is pointing north. The rotation of the arm acting with respect to $F_z$ also induces a constant electric field potential in the arm, but the central location of the axis of rotation between the arms results in an equal and opposite potential being induced in the other arm. Because the arms are in series connection as shown in FIG. 5, these D.C. induced potentials are ignored in the following description.

At the same time, the velocity component $v_z$ acting with respect to $F_y$ induces the following electric field potential in phase with (1):

$$F_y v_z L \sin \omega t \tag{3}$$

Potential (3) is additive or subtractive to (1) depending on the sense of $F_z$. As shown in FIG. 5, the correction coil 42, rotating with its axis horizontal, also has a potential induced in it by $F_y$ which is sinusoidal and in phase with (3). Its maximum amplitude, being proportional to its angular velocity, is proportional to the maximum amplitude of (3) as long as $v_z$ and $\omega$ remain proportional. By selection of appropriate parameters this potential is made equal to the sum of the additive values of (3) for both arms, and the coil is connected in series with opposed polarity to the arms, thereby cancelling the potentials (3) therein.

If $\theta$ is defined as the angle between north and $v_H$, the sum of (1) and (2) for one arm equals $$E_H = F_z |v_H| L \sin (\omega t - \theta) \tag{4}$$

and the values of $E_H$ in the two arms are additive in series connection.

Given $F_z$ and $L$ which can be measured by independent means, the direct measurement of $E_H$, if it were practical, would yield the value $v_H$. However, such a direct measurement is not possible, as may be explained by reference to FIG. 6 which schematically illustrates a simplified case.

In FIG. 6 a single horizontal arm of length L and internal resistance $r_b$ is located within a large body M of the sea water having the same length and shown by broken lines. One end of the arm is in electrical contact with the sea water and the other end is insulated and connected to one lead of a voltmeter 75, the other lead of which is connected with the sea water through a switch s. The voltmeter has an internal shunt impedance $r_v$. The arm is moved at the constant horizontal velocity $v_H$ of the body M of sea water, in a straight line at right angles to its length and without rotation.

With the switch open, a current flows in the body M in a direction at right angles to $v_H$, this current being independent of the presence of the arm, as explained by the applicant Sanford in "Measurement and interpretation of motional electric fields in the sea," Ph.D. Thesis, Massachusetts Institute of Technology, 1967 and papers therein cited. Briefly, electric field potentials are induced both in the body M and in the arm by electromagnetic induction and each has the value $F_z v_H L$. Current flows through the body M which has resistance $r_e$ and returns through an external circuit including surrounding sea water and the bottom.

The above cited papers show that in an ocean current which is broad compared to the ocean's depth, this current has a value such that the potential difference between the ends of the body M may be represented schematically by an external source $F_z \bar{v}_H L$, where $\bar{v}_H$ is the average horizontal velocity of the water between the surface and the bottom.

Assume next that the switch is closed and that the resistance $r_v$ is much larger than $r_b + r_e$. In this case it may be seen by inspection that the value of the voltage $V$ measured by the meter is substantially equal to the difference between the voltage induced in the arm and the external source, and has the value $F_z L (v_H - \bar{v}_H)$.

If we next consider the embodiment described above in connection with FIG. 5, it is seen that the potential difference between the ends of the two rotating arms may be schematically represented by a source $E_2$, which produces a potential drop equal to $$V_1 = 2F_z |\bar{v}_H| L \sin (\omega t - \theta'), \tag{5}$$

where $\theta'$ is defined as the angle between north and $\bar{v}_H$. We may solve for the potential $V_2$ across a low noise preamplifier 76, connected to complete the circuit between the electrodes 68 and 70 through the correction coil 42. For this purpose we assume that the internal arm impedances $r_b$ are negligible compared to that of the preamplifier, and we ignore the potential (3), defined above, which is cancelled by that induced in the coil 42 and the two mutually cancelling D.C. potentials induced in the arms by their rotation in $F_z$, as also discussed above.

$$V_2 = 2E_H - V_1 = 2F_z |v_H - \bar{v}_H| L \sin (\omega t - \theta''), \tag{6}$$

where $\theta''$ is defined as the angle between north and $(v_H - \bar{v}_H)$. Thus, given the values $F_z$ and $L$, the measured potential $V_2$ yields a velocity value relative to $\bar{v}_H$. The value $\bar{v}_H$ may be determined in an absolute way by an independent measurement. Such measurements are presently well known or will be apparent to those familiar with this art. They include, for example, the measurement of the surface current by navigational means and electrical measurements on the sea floor when $v_H$ is zero.

As already noted, the value $V_2$ is transmitted to the vessel 18, and for this purpose it is important to ascertain the corresponding depth of the probe. This is done by automatic measurement of the water pressure as hereinafter described.

Figure 4:
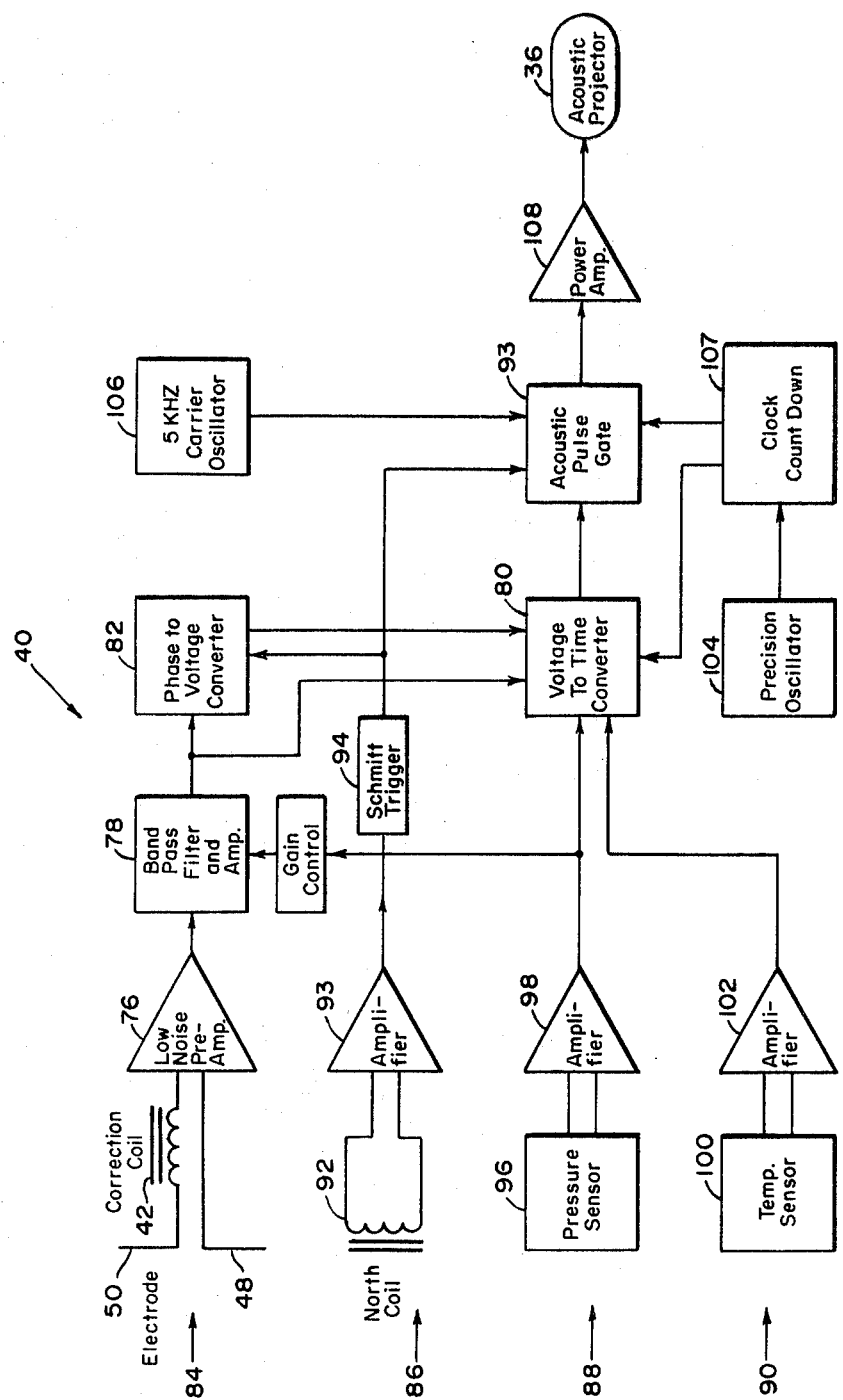
FIG. 4 is a block diagram showing the functional relationships of the electronic components housed in the probe of FIG. 2.

Referring to FIG. 4, the preamplifier 76 is connected with a bandpass filter and amplifier 78 tuned to accept the frequency of angular rotation of the probe. This is desirable as a means of attenuating the effects of spurious bias potentials that might otherwise become significant because of the small potentials being measured, the latter being typically in the range of 1 to 100 microvolts. For purposes of simplification, these bias potentials are omitted from the drawing. These spurious effects, which are not modulated by the rotation, include (a) differences in the contact potentials between each electrode and the sea water resulting from slight differences in the structures of the electrodes, (b) the relatively great sensitivity of these contact potentials to any slight differences in the salinity or temperature of the sea water at the respective electrodes, and (c) effects of electro-chemical action between dissimilar metals employed in the probe structure. An appreciation of (b) will be obtained from the fact that a temperature difference of one degree Centigrade between the electrodes will cause a voltage difference of about 350 microvolts, and a difference of one part per thousand in salinity will cause about 500 microvolts voltage difference. The purpose of employing the salt bridge construction described above is to minimize these temperature and salinity effects.

Figure 7:
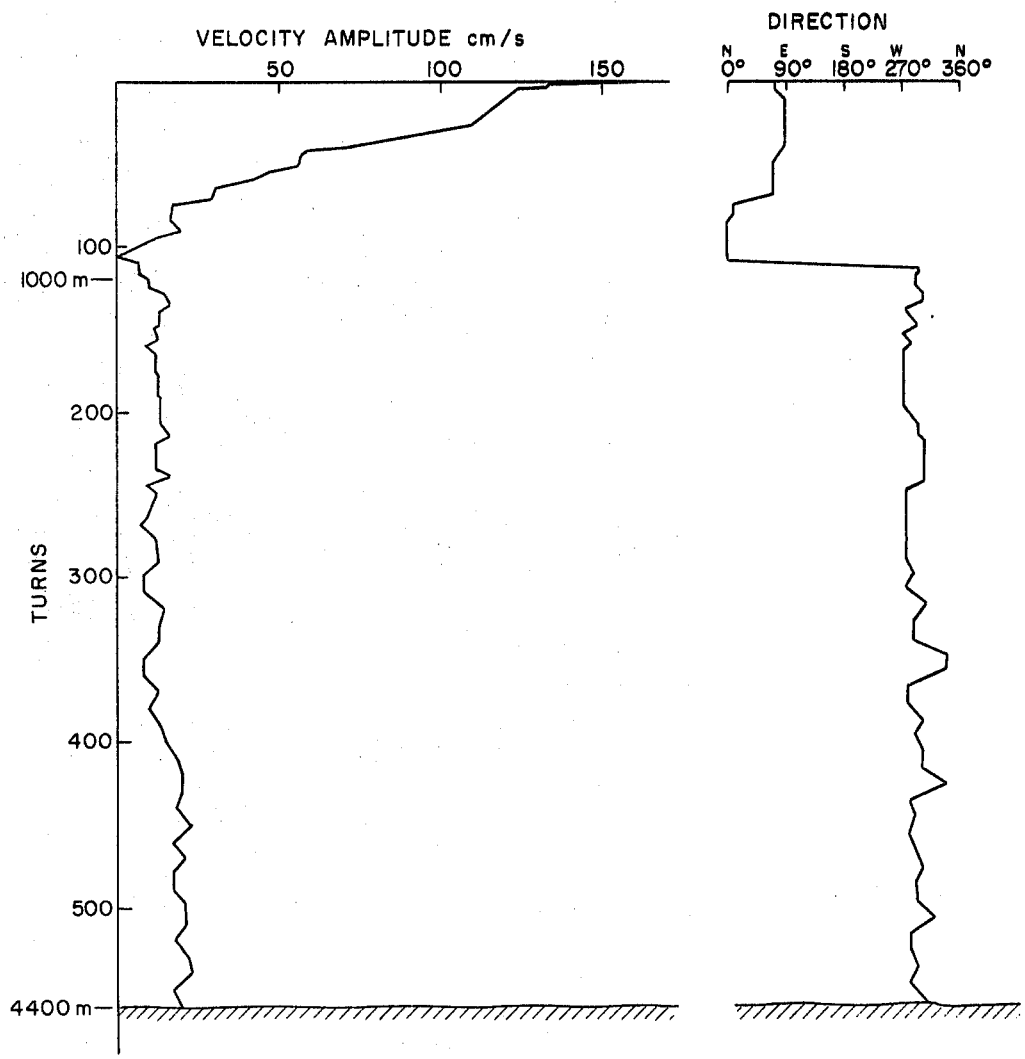
FIG. 7 is a composite graph showing water current direction and velocity data derived from the operation of the invention.

The circuit 40 of FIG. 4 is further described as follows. The pre-amplifier 76 preferably has a low noise-factor under one micro-volt peak-to-peak for a passband of 0.05 Hz to 1.0 Hz. The amplified signal $V_2$ is passed through the bandpass filter and amplifier 78, which preferably has a flat characteristic within one percent and a constant phase shift over the band width from 0.1 Hz to 1 Hz. The low-frequency attentuation rolls off at 12 db per octave. In one embodiment, the filter stage has two fixed-gain settings that are automatically controlled by the pressure channel output voltage described below. When the depth of the instrument is greater than a pre-set value, the gain is increased by a factor of 4. The gain change increases the resolution of the instrument in the deep, generally weak ocean currents beneath the stronger near-surface currents, which will be evident from FIG. 7. The output from the filter and amplifier 78 goes to a voltage-to-time converter 80 and a phase-to-voltage converter 82, hereinafter further described.

The channel associated with the electric field sensor arms 48 and 50 is referred to generally as the electric field channel 84. In addition to this channel, there is a north coil channel 86, a pressure channel 88 and a temperature channel 90.

The function of the north coil channel 86 is to detect the time at which the salt bridge arms are aligned in the north-south direction. A coil 92 similar in construction to the correction coil 42 is oriented so that the line normal to the cross sectional area of the coil is parallel to the arms 48 and 50. As the instrument rotates a sinusoidal signal is generated with zero crossings as the arms align in the north-south direction. The signal passes through an amplifier 93 and the zero crossings are detectd by a circuit 94 that generates a square wave having a period equal to the period of rotation of the probe. The square wave is used by the phase-to-voltage converter 82 and by an acoustic pulse gate 93. The phase-to-voltage converter 82 measures the phase angle between the north coil signal and the electric field signal. To this end, the converter measures the period of the square wave generated by the north coil channel, and this period measurement is converted to a D.C. voltage. Another square wave is generated by detecting the zero crossings of the electric field signal. The time difference between the positive-going edges of the north coil square wave and the electric field square wave is measured and converted to a D.C. voltage. This voltage is divided by the period voltage to give a normalized phase voltage. The purpose in normalizing the phase signal is to overcome the fact that the frequency of rotation of the probe varies up to 5 percent above and below the average frequency. The output of the phase-to-voltage converter 82 passes to the voltage to time converter 80.

The pressure channel 88 includes a bonded strain gauge 96 to which is connected a low-drift-low-noise differential amplifier 98. This amplifier is in turn connected to the voltage-to-time converter 80.

The temperature channel 90 includes a temperature sensor 100, preferably a thermistor, connected in the feedback path of an operational amplifier 102. Preferably, the thermistor is shunted with a resistor which makes it possible for the output of the temperature channel to be linear to within 0.15° Centigrade throughout a range of 0° to 30° Centigrade. The output is connected to the voltage-to-time converter 80.

Precisely-timed acoustic pulses are used to telemeter data to the receiving system of the vessel 18, and to obtain tracking information. Data is transmitted by delaying a pulse with respect to a reference pulse. The technique is generally well understood and is herein described only in general outline. According to this technique, the delay of the data pulse is directly proportional to the variable measured by the pulse. The range and telemetry section of the instrument consists of a precision oscillator 104, a carrier oscillator 106, the acoustic pulse gate 93, a clock countdown crcuit 107, a power amplifier 108 and the acoustic projector 36. The oscillator 104 is synchronized with a master clock on the vessel immediately before a drop. The master clock is also associated with a precision graphic recorder on the vessel, and is used to synchronize the start of each sweep during the drop. The recorder is a strip chart recorder of the type commonly in use for acoustic telemetry, on which the axes are time versus time versus the intensity of the received acoustic signals. Normally, the record produced is a single continuous strip of paper with a reference time line across the top generated by the master clock on the ship. The record has a skew caused by the propagation delay of the signals, and the delay between the reference time of the master clock and the arrival of the reference pulse from the instrument clock determines the slant range between the vessel and the probe. The surface range to the point directly above the probe can be computed with slant range and pressure information. To measure the approximate bearing to the point over the probe, two hydrophones 38 of a known separation are used, as shown in FIG. 1. The bearing is computed from the difference of arrival times of any one pulse at the two hydrophones. Knowledge of the relative position of the probe is very important for the security of instrument recovery, for obtaining maximum acoustic signal strength, and for reducing the probe recovery time.

The oscillator 104 generates all of the timing pulses that are needed to control the probe. In a typical embodiment the oscillator is a 5 MHz crystal oscillator with a long-term drift of less than $5 \times 10^{-9}$ per day. The oscillator is located in a temperature-controlled oven that limits the temperature drift to less than $5 \times 10^9$ for an ambient temperature range of 0° to 30° C. The control pulses are generated by dividing down the output frequency of the oscillator with low-power complementary MOS integrated circuits comprising the clock countdown circuit 107. The clock can be synchronized by applying an external pulse from the master clock in the vessel. The clock supplies pulses for generating the two voltage ramps in the voltage-to-time converter 80 that are used, respectively, for re-setting and starting and for stepping the latter. The reference pulse that is used for measuring the slant range from the probe to the vessel is generated once every second and applied to the acoustic pulse gate.

The main function of the voltage to time converter 80 is to delay a pulse with respect to the reference pulse by a time interval proportional to the input data whose magnitude is to be transmitted. Conversion is performed by a voltage comparison between the input voltage and either of two digitally-generated voltage ramps. Two voltage ramps are needed in order to obtain maximum resolution and optimal band widths and priority as required by the different signals being telemetered. The electric field signal is sampled at a rate of five times per second so that the peak-to-peak value of the field can be easily measured on the recorder aboard the vessel. The recorder on the vessel preferably operates at a rate of 5 sweeps per second in synchronism with the ramp. The resolution that is required for pressure and temperature can be achieved at the slower rate of one sample per second. With the recorder operating at 5 sweeps per second, the pressure and temperature pulse will go across the record 5 times for 0 to full scale.

The ramp circuitry consists of binary counters, current sources and current summing networks. The binary counters count the stepping pulses from the precision clock. At the end of 500 steps the ramps are reset to zero and allowed to restart. The output of each counter controls the on and off state of a current source. The current sources are summed across a resistor to generate a voltage ramp of 500 steps. Each of the five variables is compared with a separate voltage comparator using either the fast (0.2 sec.) or the slow (1.0 sec.) ramp. A flip-flop at the output of each comparator eliminates re-triggering by noise. The change of state of each flip-flop goes to the acoustic pulse gate 93.

The function of the acoustic pulse gate 93 is to accept the telemetry pulses and to generate 5 kHz tone bursts that drive the acoustic power amplifier 108. The telemetry pulses originate in the voltage-to-time converter, the precision clock 104 and the north coil channel 86. These pulses operate four one shot multivibrators having output pulse durations of 5, 7.5, 10 and 150 millisecond. The outputs of the multivibrators control the gating of the 5 kHz square-wave carrier oscillator 106. The 5 kHz tone bursts drive the acoustic power amplifier 108.

The power amplifier 108 takes the input tone bursts and amplifies them to a peak power of about 40 watts. The output of the power amplifier is a square wave that is used to drive a barium-titanate transducer comprising the electro-acoustic transducer 36. The transducer 36 is tuned to the 5 kHz carrier frequency. About 10 watts of omnidirectional acoustic power is delivered by the projector into the water.

Field tests of the instrument described above have been conducted and have demonstrated the utility of this invention for producing vertical profiles of ocean currett movements in great detail. Actual measurements are made, as described above, approximately every eight meters measured vertically, so that more than 500 observations can be made in a typical one-way profile of the Gulf Stream, for example. Therefore, the use of this technique will allow the space and time variations of ocean currents to be studied in a detail not possible by using any of the methods previously employed in this art.

In the foregoing description it is stated that the particular described probe 12 of FIG. 1 is allowed to rotate and to fall freely to the bottom and then to rise freely to the surface during the measurements. However, it will be apparent from the foregoing description that the principles of the invention are not dependent upon this particular mode of use, and that the probe may be used in other ways. For example, it may be constrained by a support or cable as it moves. It may also be allowed to fall freely to a predetermined depth, such depth being either at the bottom or above the bottom, and to remain at that depth for a period of time during which useful measurements may be taken. It may also remain at the sea surface during the measurements. In the case where it is allowed to rest on the sea bottom, $v_H$ is zero and the measurements are those associated with the potential gradient due to $\overline{v}_H$ as discussed above. More specifically, in this case the measured value $V_2$ in equation (6) becomes equal to $V_1$ in equation (5).

In some embodiments the probe does not rotate and the two arms may be located in mutually orthogonal relationship in order to measure the vector electric field. In the absence of rotation, an alternative is provided to the above-described method of eliminating bias potentials by tuning the amplifier to accept the frequency of angular rotation of the probe. Two alternative embodiments of this type are shown in FIGS. 3A and 3B. These figures are schematic representations of sensors constructed like the sensor 44 of FIG. 3, except that electromechanical valves have been added and connected to the arms 48 and 50 between the arms and the chambers 62 and 64 within the blocks 58 and 60. It will be understood that these connections are made to the sea water within the arms through suitable apertures in the walls of the insulating tubes 52, preferably near the inner ends of the tubes adjacent their connections to the blocks 58 and 60.

In the embodiment of FIG. 3A there are valves "a" and "b" which are opened and closed sequentially. During a time interval that may be called a "normal interval" the valve "a" is open and the valve "b" is closed. During this interval the voltage measured by the arms is the signal $V_2$ plus the bias. At the end of this interval the valve "a" is closed and the valve "b" is opened, and a measurement is then made of the electrode bias alone. Depending on the application the valves may be actuated to make this latter measurement at various intervals from several times a second to several times an hour.

In the embodiment of FIG. 3B there are four valves "c," "d," "e" and "f" which are opened and closed sequentially to cause an interchange of the electrodes. During a first time interval the valves "c" and "d" are open and the valves "e" and "f" are closed. During a second time interval the valves "c" and "d" are closed and the valves "e" and "f" are open. These reversals cause reversal of the signal $V_2$ but not of the bias, and the bias is therefore eliminated by tuning the amplifier to accept the frequency of the reversals.

In cases where the instrument is not rotated, an alternative to the north coil 92 of FIG. 4 is also provided. The orientation of the arm can be determined by use of a compass.

In some cases in which the probe rotates, two orthogonal arms may be used to advantage in that they permit instantaneous measurements of electric field vectors by resolving the voltages on the two arms, rather than by waiting for the rotation of the arm through its position of maximum induced voltage.

Figure 9:
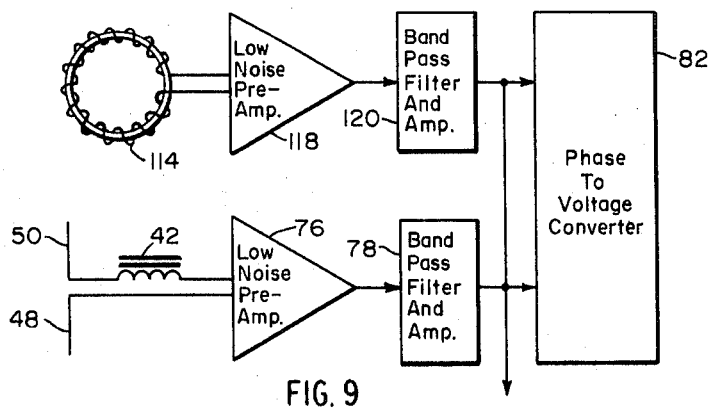
FIG. 9 is a block diagram showing the functional relationships of the electronic components housed in the probe of FIG. 8.

FIGS. 8 and 9 illustrate an alternative embodiment of the invention in which measurements are made without using electrodes or salt bridges. A probe 112 has a wire wound toroidal coil 114 mounted in fixed position at one end so that it rotates with the probe. The plane of the coil is maintained substantially vertical. The coil has a voltage induced in it by transformer action. Effectively, the primary winding of the transformer is a loop designated by a broken line 116 and representing an electric current flowing horizontally in the sea water and returning through a circuit including the bottom. This current exists irrespective of the presence of the probe, as stated above, and is induced by the vertical field component $F_z$, being oriented at right angles to $v_H$. Referring to the above description in connection with FIG. 6 for the case where the switch s is open, the value of this primary current is given by $$I = [F_z (v_H - \bar{v}_H)L/r_e] \qquad (7)$$

This expression may be rewritten in terms of the current density J and the coil area A if the latter is assumed equal to the cross sectional area of the body M. The value of J is given by $$J = \sigma F_z (v_H - \bar{v}_H), \qquad (8)$$

where $\sigma$ is the electrical conductivity of the sea water. The value of $r_e$ is given by $$r_e = (L/\sigma A) \qquad (9)$$

Therefore, taking the rotation of the probe into account, from these expressions we have $$I = JA \sin \omega t. \qquad (10)$$

The secondary current in the coil 114 is proportional to I and therefore also to $v_H - \bar{v}_H$. It is therefore comparable to equation (6) in this respect.

As shown in FIG. 9, the coil 114 and associated circuit components may be connected to the circuit of FIG. 4. The coil is connected to a low-noise preamplifier 118 similar to the preamplifier 76 in FIG. 4. This is in turn connected to a band pass filter and amplifier 120 similar to the amplifier 78, which is in turn connected to the latter and to the converter 82. Thus the signal from the coil 114 may be used in addition to, or as a substitute for, the signal derived from the arms 48 and 50. The rest of the circuit may be similar to that shown in FIG. 4.

I claim:

1. A method of measuring the velocity characteristics of an ocean current in which a horizontal electric field exists, said field being substantially proportional to the average horizontal velocity of said ocean current between the surface and the bottom along a line parallel to the vertical component of the earth's magnetic field, including the steps of generating an electric current in a detector located at a given depth in said ocean current, said current resulting from the interaction with said vertical component of the earth's magnetic field of the difference between said average horizontal velocity and the horizontal velocity of said detector, and recording a value proportional to said electric current.

2. The method according to claim 1, in which said electric current is generated by magnetic transformer coupling to the electric current flowing in the ocean at the location of said detector.

3. The method according to claim 1, in which said electric current is generated by electromagnetic induction along a line having a horizontal component of length, said line being moved successively to a plurality of positions spaced along a descending path in said ocean current and moving at each said position substantially at the same horizontal velocity as the contiguous ocean current.

4. The method according to claim 3, in which said line is substantially horizontal.

5. The method according to claim 3, in which the line is rotated at a substantially constant frequency about a substantially vertical axis.

6. The method according to claim 5, in which said substantially vertical axis intersects said line substantially at its midpoint.

7. The method according to claim 3, including the steps of generating an electric correction potential equal to that induced along said line as a result of the vertial component of velocity of said detector through the horizontal component of the earth's magnetic field, and applying said correction potential to cancel that induced along said line.

8. The method according to claim 5, including the step of passing the electric current through a band pass filter tuned to said frequency.

9. The method according to claim 3, in which the electric current is periodically alternated, and including the step of passing the electric current through a band pass filter tuned to the frequency of said alternation.

10. A probe for measuring velocity variations with depth in ocean currents, said probe having, in combination, means to cause the probe to descend toward the bottom, and means for generating in the probe an electric current resulting from the interaction with the vertical component of the earth's magnetic field of the difference between the average horizontal velocity of said ocean current between the surface and the bottom and the horizontal velocity of said probe.

11. A probe according to claim 10 which is buoyant and includes releaseable weight means to cause it to descend toward the bottom and to return toward the surface.

12. A probe according to claim 10, in which the generating means include a toroidal coil and means to maintain a substantially vertical orientation of its plane.

13. A probe according to claim 10, including fin means to cause it to rotate at a substantially constant frequency about a substantially vertical axis as said probe descends.

14. Apparatus acording to claim 13, including a band pass filter in connection with said means for generating and tuned to said frequency.

15. Apparatus for measuring velocity variation with depth in ocean currents including, in combination,
   a buoyant probe having longitudinally conductive laterally insulated arm means, said arm means having an end thereof adapted for electrical connection with contiguous sea water,
   means to detect an electric potential induced in said arm means, said potential resulting from the interaction with the vertical component of the earth's magnetic field of the difference between the average horizontal velocity of said ocean current between the surface and the bottom and the horizontal velocity of said probe, and
   means operable to overcome the buoyancy of said probe to cause it to descend freely when released in said water, said probe being adapted to orient said arm means along a line having a horizontal component as said probe descends.

16. Apparatus according to claim 15, in which said probe is adapted to orient said arm means substantially horizontally as said probe is falling.

17. Apparatus according to claim 15, in which the probe has fin means to cause it to rotate at a substantially constant frequency about a substantially vertical axis as said probe descends.

18. Apparatus according to claim 17, in which said substantially vertical axis intersects said line at substantially its midpoint.

19. Apparatus according to claim 15, in which the probe has a correction coil formed about an axis substantially parallel to said arm means and in connection with said means to detect.

20. Apparatus according to claim 19, in which said correction coil is in series connection with said arm means.

21. Apparatus according to claim 17, including a band pass filter in connection with said means to detect and tuned to said frequency.

22. Apparatus according to claim 15, including a sonic transmitter in connection with said means to detect.

23. Apparatus according to claim 22, including water pressure sensing means connected with said transmitter, said transmitter being adapted to transmit signals independently measuring said electric potential and water pressure.

24. Apparatus according to claim 15, in which said arm means include a pair of arms each having one end adapted for electrical connection with contiguous sea water and an electrode at its opposite end for connection with said means to detect.

25. Apparatus according to claim 24, in which the arms are of substantially equal length, the probe having fin means to cause it to rotate as said probe descends at a substantially constant frequency about a substantially vertical axis midway between the ends of said arms adapted for electrical connection with contiguous sea water.

26. Apparatus according to claim 24, in which each of said arms comprises an insulating tube filled with an electrolyte and having an outwardly exposed conductive plug having inner contact with said electrolyte.

27. Apparatus according to claim 26, in which said electrolyte is sea water and said plug is porous.

28. Apparatus according to claim 27, having an insulating plate, each of said arms being closed at its said opposite end by said plate and having its electrode mounted thereon.

29. The method according to claim 1, in which said electric current is generated by electromagnetic induction of a potential between two electrodes respectively connected with the ambient ocean water at the ends of a line having a horizontal component of length.

30. The method according to claim 29, including the step of periodically interrupting the connection of an electrode and one of said ends.

31. The method according to claim 29, including the step of periodically interconnecting the electrodes.

32. The method according to claim 29, including the step of periodically reversing the connections of the electrodes to said ends.

33. The method according to claim 1, in which said electric current is generated and said value is recorded at each of a plurality of positions spaced along a descending path in said ocean current.

34. The method according to claim 1, in which the detector is moved along a descending path in said ocean current and said value is recorded at each of a plurality of positions spaced along said path.

35. The method according to claim 34, in which the detector rotates about a substantially vertical axis as it descends along said path.

36. The method according to claim 1, in which the horizontal velocity of said detector is zero.

37. The method according to claim 1, in which the horizontal velocity of said detector substantially equals and has the same direction as the horizontal velocity of the ocean current at the depth at which it is located.

* * * * *